3,776,903
PROCESS OF PREPARING 6-AZAURACIL
William Drell, Del Mar, and Donald E. Gueffroy, San Diego, Calif., assignors to Calbiochem, La Jolla, Calif.
No Drawing. Continuation-in-part of abandoned application Ser. No. 112,775, Feb. 4, 1971. This application Aug. 10, 1972, Ser. No. 279,999
Int. Cl. C07d 55/10
U.S. Cl. 260—248 AS                               15 Claims

ABSTRACT OF THE DISCLOSURE 6-azauracil is produced by combining thiosemicarbazide, glyoxylic acid, and dimethyl sulfate in aqueous solution. Cyclization occurs, with the production of the desired product. The procedure is simple, gives good yields, and requires only commercially available starting materials, and is readily adapted to continuous flow synthesis.

---

This application is a continuation-in-part of our copending application, Ser. No. 112,775, filed Feb. 4, 1971, now abandoned.

This invention relates to an improved process for preparing 6 - azauracil (2,3,4,5-tetrahydro-1,2,4-triazine-3,5-dione).

6-azauracil is a compound of growing importance. It is an intermediate for the production of pharmacologically valuable drugs; and it has been found to have value as a poultry feed additive, for combatting coccidiosis. A number of preparative methods for this compound appear in the literature, the following being representative citations:

Gut, J.: Adv. Heterocyclic Chem. 1, 204 (1963)
Seibert, W.: Chem. Ber. 80, 494 (1947)
Barlow et al.: J. Am. Chem. Soc. 78, 1258 (1956)
Gut, J., et al.: Coll. Czech. Chem. Comm. 24, 2986 (1959)
Bobek, M., et al.: Ibid. 32, 1295 (1967)

The methods heretofore available are not entirely satisfactory, suffering variously from low yields and from relatively complicated and time-consuming steps. One method is described in the paper by Bobek et al., cited above, in which glyoxylic acid thiosemicarbazone is first prepared, and is then refluxed with water and methyl iodide. Following refluxing, the solution is concentrated by evaporation and the concentrate cooled to deposit crystals of the desired compound.

An object of the present invention is to provide an improved procedure for the preparation of 6-azauracil which is essentially a one-step process commencing with readily available starting materials and requiring only simple equipment and capable of giving high yields.

Other objects of the invention will appear as the description thereof proceeds.

Generally speaking, and in accordance with illustrative embodiments of our invention, we bring together in an aqueous environment thiosemicarbazide, glyoxylic acid, and dimethyl sulfate. The order of addition may be varied, as will appear in detail hereinbelow, and in some cases the action is that glyoxylic acid thiosemicarbazone is formed, the cyclization of which is brought about by the dimethyl sulfate so that 6-azauracil is formed. In the course of the cyclization, methylmercaptan is formed, but since this is a gas no problem is involved in separating the 6-azauracil from the reaction mixture.

In accordance with a first embodiment of our invention we may bring together thiosemicarbazide and glyoxylic acid in aqueous solution, which then forms glyoxylic acid thiosemicarbazone. Both starting materials may conveniently be prepared in aqueous solution, which are then mixed together. The mixing is continued until the resultant formation of glyoxylic acid thiosemicarbazone is substantially complete. Thirty minutes mixing at room temperature is quite adequate. We then add dimethyl sulfate to this reaction mixture, and, with agitation, we heat to reflux and continue refluxing until the resultant cyclization to 6-azauracil is substantially complete. Ninety minutes has been found to be quite sufficient. During the refluxing, the methylmercaptan which is evolved may be passed through a suitable trap or scrubber to prevent atmospheric pollution. We then cool the reaction mixture to within the range 0° C. to about 5° C. and maintain it at this low temperature until crystallization of the 6-azauracil is substantially complete. One day, i.e., about 24 hours, has been found sufficient for this. Optionally, we then recover the crystals as by filtration or centrifuging, and optionally and preferentially, we wash the crystals with ice water and eventually with methanol. The crystals may eventually be dried, for example at 50° C. The average yields in accordance with the inventive process range from 70% to 85%. The product is quite pure, exhibiting a melting point range of 274°–277° C.

The relative proportions of the starting materials may vary somewhat, as will be clear from the following discussion. While theoretically one mole of thiosemicarbazide should be used for each mol of glyoxylic acid, there is a slight tendency for the former to undergo some hydrolysis, so that as a practical matter we use at least a 5% excess and preferably a 10% excess of thiosemicarbazide. A great excess is not needed and is wasteful, so that a practical range is from about 1.05 to about 1.25 mols of thiosemicarbazide for each mol of glyoxylic acid. When this slight excess of thiosemicarbazide is used, it appears that the reaction goes to substantial completion, so that for each mol of glyoxylic acid used, substantially one mol of glyoxylic acid semicarbazone is formed.

Again, the probable mechanism of cyclization requires one mol of dimethyl sulfate for each mol of starting glyoxylic acid. The dimethyl sulfate is however subject to hydrolysis, and moreover there is some indication that a reasonable excess speeds up the cyclization. Accordingly, we have found that from about 1.1 to about 4 mols, with an optimum of about 2 mols, of dimethyl sulfate is practical, for each mol of glyoxylic acid.

The relative proportion of water is variable within wide limits, except that of course when more water is used than the optimum, the reaction rates are retarded and moreover complete recovery of the product is made more difficult. We have found it practical to dissolve the thiosemicarbazide in from about 8 to about 40 times its weight of water, preferably hot, ca. 80° C., about 12 times being practical and preferred; and to dissolve the glyoxylic acid or glyoxylic acid hydrate in from 2 to 4 times its weight of water, which may be at room temperature, about 3 times being optimum. It will be appreciated by those skilled in the art that these ranges may be considerably exceeded, and the distribution of water as between the two solutions varied greatly. The dimethyl sulfate may be added without predissolving. It may be noted that the solution of glyoxylic acid has a quite low pH, so that we prefer to add that solution to the solution of the thiosemicarbazide, as already described, rather than conversely. If the order of addition were reversed, some of the thiosemicarbazide would be present in a considerable excess of glyoxylic acid in solution, and the high acidity would tend to cause hydrolysis of the former.

A working example will now be given:

Twenty kilos of thiosemicarbazide are dissolved in 214 liters of water, initially at about 80° C. in a 100-gallon glass lined reactor. 18.2 kilos of glyoxylic acid monohydrate are dissolved in 59 liters of water at room temperature; this solution is added to the contents of the reactor with mixing. Mixing is continued for thirty minutes without any external heating. Then 37.3 liters of dimethyl sulfate are added, mixing being continued. As soon as this has been added, the reactor is brought to reflux temperature, and refluxing is continued for ninety minutes. The mercaptan evolved is collected in a trap of conventional design, using caustic soda. The reaction mixture is then cooled to the range 0° C. to 5° C., and maintained there for 24 hours. At the end of this period, the 6-azauracil product has separated out in the form of fine crystals. These are recovered by filtering, washed three times with five-liter portions of ice water, and then washed twice with five-liter portions of methanol. The crystalline product is then dried at about 50° C. The yield is approximately 15 kilos of 6-azauracil. In this example, the molar ratios were, for each mol of glyoxylic acid hydrate, 1.11 mols of thiosemicarbazide, and 2.0 mols of dimethyl sulfate.

The procedure in accordance with the inventive embodiment just described possesses great practical advantages, in that the desired product is made in what is essentially a single batch procedure, in that the starting materials are added to the reactor and no intermediate products need be recovered or purified or the like, the desired product being formed in the same reactor. The difficulty encountered with use of methyl iodide, arising from the fact that methyl iodide forms two phases with aqueous solutions even at elevated temperatures and thus steam-distills off, is avoided, since dimethyl sulfate forms a homogeneous solution at the temperatures used in the invention. It is surprising and unexpected that dimethyl sulfate is operative in this procedure, since it is nortorious for its rapid hydrolysis when dissolved in water, particularly at elevated temperatures. We are unable to explain the mechanism involved, other than to suggest the possibility that the dimethyl sulfate is taken up by the thiosemicarbazone more or less immediately, before it has been destroyed by the hydrolysis which would necessarily take place were it still in simple solution.

While we have described this embodiment in terms of refluxing for the process step in which cyclization takes place, it will be appreciated that the temperature of approximately 100° C., depending upon the atmospheric pressure, which is achieved by refluxing is not absolutely necessary to effect cyclization. In practice, the reaction mixture may simply be maintained at an elevated temperature of at least about 70° C., until cyclization is completed. Of course, in general, the lower the temperature, the longer this step will require, so that we prefer refluxing both for convenience and economy of time.

In accordance with another embodiment of the invention, in which the same materials are brought together in a different order of addition, we may initially bring together the thiosemicarbazide and the dimethyl sulfate in aqueous solution. This may be done at room temperature or at an elevated temperature, for example as high as 85° C. or even 100° C. If these materials are brought together at room temperature, the three-phase mixture which is initially present may be stirred, whereupon it rapidly forms a stable, homogeneous solution, which is quite stable. Then the glyoxylic acid may be added to this solution, and here again, the solution may be left at room temperature, or may be heated. If left at room temperature, methylmercaptan is slowly evolved over a period of several days with a resultant crystallization of 6-azauracil. If the solution is heated, and any temperature from room temperature to 100° C. may be used, then the transformation to 6-azauracil is accelerated. Any temperature sequence may be used; for example, the solution may be allowed to stand for a day after the addition of the glyoxylic acid and then heated and refluxed, perhaps 30 minutes at high temperature being sufficient to complete the cyclization.

Alternatively, the thiosemicarbazide and the dimethyl sulfate may be brought together in water solution at an elevated temperature, for example anywhere from 30° C. to 85° C. and mixed for a few minutes, and then either immediately or after a lapse of time which may be several days, the glyoxylic acid may be added, whereupon the formation of the desired product takes place, rapidly or slowly as the temperature of the reaction mixture is high or low respectively.

The following gives a general working procedure illustrating this embodiment of the invention for the case in which the thiosemicarbazide and the dimethyl sulfate are combined with the water at an elevated temperature. For each mol of thiosemicarbazide, from 1.0 to 1.8 mols of dimethylsulfate are added to form an aqueous solution with conveniently from about 8 to 50 parts by weight of water for each part by weight of thiosemicarbazide, with the solution being brought to approximately 85° C. and mixed for one to ten minutes. From about 0.8 to about 1.5 mol of glyoxylic acid, conveniently in a 25% by weight solution in water is then added and the mixture is refluxed for 20 minutes to one hour. The reaction mixture is then allowed to cool, and left at room temperature or below for approximately 24 hours. The crystalline 6-azauracil which is formed is collected, and may be washed with methanol and dried at conveniently 50° C. to 60° C.

This second embodiment of the invention will be further illustrated for the case in which the thiosemicarbazide and the dimethyl sulfate are combined with the water at the relatively low temperatures. Here again, the thiosemicarbazide, the dimethyl sulfate and the water are added in the proportions just given. A mild exothermic reaction takes place as the thiosemicarbazide goes into solution, and the temperature may be kept relatively low, for example at room temperature or somewhat below or somewhat above, as desired by the operator, by adding ice. A preferred final volume of water including any melted ice which may have been used is approximately 11 or 12 parts by weight of water for each part by weight of thiosemicarbazide. The next step in the process may follow immediately, or the solution may be held at room temperature for a period of several hours, several days, or even one or two weeks, with obvious advantages from a practical production standpoint. The glycolic acid in the proportions already given, and in aqueous solution, conveniently 25% to 50% by weight, is then added to the solution, which may then be allowed to stand for several days as already described whereupon the 6-azauracil crystallizes out; or this cyclization may be speeded up by heating the reaction mixture to reflux temperature and keeping it under reflux for the period of time necessary for the cyclization to be complete, which is from 15 minutes to 2 hours, depending upon conditions. The hot solution is allowed to cool to room temperature and the 6-azauracil crystallizes out and is collected. It may be washed with water or methanol, and dried under vacuum if desired to constant weight. Cooling of the solution to less than room temperature, for example to 5° C. does not appear to improve the yield appreciably, although there is of course no objection to such cooling.

By way of specific examples following the procedure just given, the following gives results obtained in a series of syntheses in accordance with the invention:

TABLE I

| Run No. | DMS, mol | GLYO, mol | Thio and DMS premix, T.° C. | Time before add glyoxy., hrs. | Yield Gms. | Yield percent |
|---|---|---|---|---|---|---|
| 1 | 0.63 | 0.62 | 30 | 16 | 47.0 | 75 |
| 2 | 0.63 | 0.62 | 50 | 16 | 48.0 | 77 |
| 3 | 0.55 | 0.62 | (a) | (a) | 48.0 | 77 |
| 4 | 0.66 | 0.62 | (a) | (a) | 49.0 | 79 |
| 5 | 0.88 | 0.62 | (a) | (a) | 47.0 | 75 |
| 6 | 0.625 | 0.495 | (a) | (a) | 47.0 | 75 |
| 7 | 0.625 | 0.66 | (a) | (a) | 48.0 | 77 |
| 8 | 0.605 | 0.615 | 30–40 | 48 | 48.0 | 77 |
| 9 | 0.625 | 0.615 | 30 | 2–3 | 47.0 | 75 |
| 10 | 0.55 | 0.615 | 30–40 | 2–3 | 48.0 | 77 |
| 11 | 0.55 | 0.495 | 30–40 | 2–3 | 47.5 | 76 | a DMS, GLYO, Thio mixed simultaneously.

NOTE.—0.55 mol thiosemicarbazide and 535 ml. water used in all runs. DMS is dimethyl sulfate; GLYO is glyoxylic acid; Thio is thiosemicarbazide.

This second embodiment of the invention is especially adapted to the production of 6-azauracil by a continuous flow reaction, in view of the fact that the components added to the continuous flow reactor are in solution form and thus may be readily and continuously metered. Thus, a typical continuous flow reactor may be made up of four vessels in cascade, the liquid level in each vessel being maintained with an internal standpipe. The thiosemicarbazide/dimethyl sulfate solution is pumped through a flow meter, and then a heat exchanger, and then enters the steam-heated premixed vessel at the selected temperature, such as 80° C. to 85° C. The glyoxylic acid solution is automatically metered into the premixed vessel using standard liquid control equipment. The mixed solution then overflows into the first of three electrically heated reaction vessels bearing reflux condensers, with their vents connected to a scrubber provided, for example, with a hypochlorite solution to oxidize the methylmercaptan so as to avoid atmospheric pollution. The reaction mixture cascades through the three flasks, undergoing refluxing in all of them, and is collected and allowed to cool to room temperature. The resulting 6-azauracil is collected, either continuously or batchwise, from the cooled solution.

While glyoxylic acid is available in the form of the hydrate or hemihydrate, as already noted, it may of course be used in any available form, such as an approximately 25% or 50% aqueous solution.

It will be seen that the invention accomplishes its objects. Moreover, we wish it to be understood that we do not desire to be limited to the exact details of procedure which have been described, since obvious modifications will occur to a person skilled in the art.

Having described the invention, we claim:

1. A process for the production of 6-azauracil which comprises the steps of bringing together thiosemicarbazide, glyoxylic acid, and dimethyl sulfate in aqueous solution so as to permit the formation of 6-azauracil; and recovering the product thus formed from the reaction mixture.

2. The process in accordance with claim 1 wherein said dimethyl sulfate is added to said aqueous solution after said thiosemicarbazide and said glyoxylic acid have first been added thereto.

3. The process in accordance with claim 2 wherein, for each mol of glyoxylic acid, there are used from about 1.05 to about 1.25 mols of thiosemicarbazide; and from about 1.1 to about 4 mols of dimethyl sulfate.

4. The process in accordance with claim 2 wherein said thiosemicarbazide and said glyoxylic acid are each separately made into aqueous solutions, and said glyoxylic acid solution is added to said thiosemicarbazide solution.

5. The process in accordance with claim 2 wherein said cyclization subsequent to the addition of said dimethyl sulfate is carried out at a temperature of at least 70° C.

6. The process in accordance with claim 5 wherein said temperature is attained by refluxing.

7. A process for the production of 6-azauracil which comprises the steps of adding dimethyl sulfate to an aqueous solution of glyoxylic acid thiosemicarbazone; maintaining the mixture so formed at a temperature of at least 70° C. until cyclization of said glyoxylic acid thiosemicarbazone to said 6-azauracil is substantially complete; and recovering said aqueous solution.

8. The process in accordance with claim 7 wherein from about 1.1 to about 4 mols of dimethyl sulfate are used for each mol of glyoxylic acid thiosemicarbazone.

9. The process in accordance with claim 7 wherein said temperature is attained by refluxing.

10. The process in accordance with claim 1 wherein said thiosemicarbazide and said dimethyl sulfate are first brought together in aqueous solution, and said glyoxylic acid is subsequently added to said aqueous solution.

11. The process in accordance with claim 10 wherein for each mol of thiosemicarbazide there are used from about 1.0 to about 1.8 mols of dimethyl sulfate; and from about 0.8 to about 1.5 mols of glyoxylic acid.

12. The process in accordance with claim 10 wherein said cyclization is carried out at a temperature of at least 70° C.

13. A process in accordance with claim 12 wherein said temperature is attained by refluxing.

14. A continuous process for the production of 6-azauracil in accordance with claim 10 wherein said aqueous solution of thiosemicarbazide and said glyoxylic acid in aqueous solution form are each metered into a first vessel so as to become mixed together and heated to a preselected reaction temperature and wherein said solution mixture is continuously passed through a series of reaction vessels maintained at said preselected reaction temperature, and wherein said solution mixture exiting from the last of said reaction vessels is cooled and said 6-azauracil is collected therefrom.

15. The process in accordance with claim 14 wherein said preselected reaction temperature is the temperature at which said solution mixture refluxes.

References Cited
UNITED STATES PATENTS
2,956,924   10/1960   Ursprung _____ 260—248 X JOHN M. FORD, Primary Examiner